United States Patent [19]

Henton et al.

[11] Patent Number: 4,778,851

[45] Date of Patent: Oct. 18, 1988

[54] RUBBER-MODIFIED EPOXY COMPOUNDS

[75] Inventors: David E. Henton, Midland; Dale M. Pickelman, Auburn; Charles B. Arends; Victor E. Meyer, both of Midland, all of Mich.

[73] Assignee: The Dow Chemical Company, Midland, Mich.

[21] Appl. No.: 2,535

[22] Filed: Jan. 12, 1987

Related U.S. Application Data

[63] Continuation-in-part of Ser. No. 749,078, Jun. 26, 1985, abandoned.

[51] Int. Cl.[4] .......................... C08L 51/00; C08F 8/00
[52] U.S. Cl. ...................... 525/65; 525/119; 525/529; 525/902
[58] Field of Search .................. 525/65, 529, 119

[56] References Cited

U.S. PATENT DOCUMENTS

| | | | |
|---|---|---|---|
| 2,633,458 | 3/1953 | Shokal | 525/510 |
| 3,261,788 | 7/1966 | Carter et al. | 525/65 |
| 3,322,852 | 5/1967 | Trementozzi et al. | 525/65 |
| 3,322,853 | 5/1967 | Trementozzi et al. | 525/65 |
| 3,496,250 | 2/1970 | Czerwinski | 525/65 |
| 3,830,878 | 8/1974 | Kato et al. | 525/80 |
| 3,856,883 | 12/1974 | Dickie et al. | 525/65 |
| 4,419,496 | 12/1983 | Henton et al. | 525/301 |

FOREIGN PATENT DOCUMENTS

| | | | |
|---|---|---|---|
| 0045357 | 2/1982 | European Pat. Off. | |
| 48-32420 | 10/1973 | Japan | 525/65 |
| 5471127 | 6/1979 | Japan | 525/65 |
| 57-149370 | 9/1982 | Japan | 525/65 |
| 58-91755 | 5/1983 | Japan | |
| 60-28418 | 2/1985 | Japan | 525/65 |

OTHER PUBLICATIONS

Advances in Chemistry Series 125 ACS Washington, DC (1973) "Fractionation of Linear Polyethylene with Gel Permeation Chromatography", pp. 98–107.

*Primary Examiner*—Joseph L. Schofer
*Assistant Examiner*—N. Sarofim

[57] ABSTRACT

Epoxy resins contain a discontinuous phase dispersed therein, of grafted rubber particles having an insoluble rubber core and having a grafted shell containing a functionalized compound such as that provided by polymerized glycidyl methacrylate, which is reactive under curing conditions with a functionality of the epoxy resin phase. The dispersions are stable and are useful as curable coatings, and for providing toughened resins for structural applications.

18 Claims, No Drawings

RUBBER-MODIFIED EPOXY COMPOUNDS

CROSS-REFERENCE TO RELATED APPLICATION

This is a continuation-in-part of copending U.S. application Ser. No. 749,078, filed June 26, 1985 now abandoned.

BACKGROUND OF THE INVENTION

This invention relates to epoxy compounds, and in particular, to epoxy resins which contain polymeric materials contained therein.

Epoxy compounds, and in particular epoxy resins, comprise a well-known class of thermosettable resins. Such epoxy compounds possess excellent physical and chemical properties, and are particularly useful in a wide variety of applications. For example, epoxy resins are useful as coatings for a variety of substrates, laminates, moldings, adhesives, and in numerous other applications where a material exhibiting good heat resistance, hardness, electrical properties, dimensional stability, corrosion resistance and chemical resistance is desirable.

Unfortunately, typical epoxy thermoset compounds lack toughness and can exhibit brittleness. Attempts have been made to strengthen or reinforce epoxy resins by incorporating therein a variety of elastomeric materials. Examples of toughened epoxy resins are disclosed in U.S. Pat. Nos. 3,923,922; 4,221,697; 4,117,038; 3,856,883; 3,496,250; 4,082,895; 3,496,250; 3,316,195; 3,499,949 and 3,509,086; as well as European Patent Application No. 78,527, published Nov. 5, 1983: and Japanese Patent No. 55-018401.

A summary of epoxy and elastomeric blend technology is provided in *Rubber-Modified Thermoset Resins*, American Chemical Society (1984). Primarily, attempts to toughen epoxy compounds have focused on employing liquid rubbers, such as carboxyl-terminated butadiene-acrylonitrile copolymers. In certain amine cure systems, the rubber separates into distinct particles. However, the rubber must first be prereacted with the epoxy resin to ensure compatibility, and optimum cure properties, and such rubbers do not exhibit latent reactivity to the resins.

Epoxy resin and acrylonitrile butadiene styrene graft polymer blends are disclosed in U.S. Pat. No. 3,496,250. The rubbery backbone comprises from about 60 to about 10 weight percent and the the grafted polymers comprise from about 40 to about 90 weight percent of the graft polymer composition. The two components are typically placed in solution by adding them to a solvent. The blends are useful as adhesives in the form of a film solution. However, the resin-graft polymer blends do not have latent reactivity with the resin.

Unfortunately, toughened epoxy compounds typically exhibit poor heat resistance. In addition, toughened epoxy compounds can exhibit varying physical properties because commonly used elastomeric materials can vary in particle size distribution and/or behavior. Furthermore, the elastomeric materials which are incorporated into the epoxy compounds can act as plasticizers which in turn provide undesirable stability problems to the toughened compound.

In view of the deficiencies of the prior art, it would be highly desirable to provide a rubber-modified epoxy compound which is capable of good toughness without significantly sacrificing heat resistant properties.

SUMMARY OF THE INVENTION

The present invention is an epoxy resin composition suitable for preparing toughened cured epoxy resins, comprising (1) an epoxy resin continuous phase and (2) a stabilized discontinuous phase of reactive grafted rubber particles, which particles have a resin-insoluble core grafted with a shell which is reactive under curing conditions with a functionality of the epoxy resin phase.

In another aspect, this invention is a toughened cured epoxy resin, comprising an epoxy resin phase having dispersed therein reactive grafted rubber particles which have grafted to a resin-insoluble core a shell which is cocured with the epoxy resin phase.

In another aspect, the present invention is a process for providing toughened epoxy resins, said process comprising (1) dispersing in an epoxy resin continuous phase, a toughening amount of reactive grafted rubber particles which have a resin-insoluble core grafted with a shell which is reactive under curing conditions with a functionality of the epoxy resin phase, and (2) subjecting the resin phase and particle dispersion to conditions sufficient to cure the epoxy resin phase.

The compositions of this invention can be broadly described as rubber-modified epoxy compounds. The compositions of this invention are stable dispersions of polymer in the epoxy resin. As used herein the term "stable" is meant to refer to dispersions which remain substantially constant (i.e., do not undergo substantial reprecipitation or redispersion) under conditions of preparation as well as conditions of thermal cure. For example, the dispersion of grafted rubber particles remains stable (e.g., insoluble and non-coagulating) under normal preparation, handling and processing (e.g., curing) conditions by maintaining a substantially constant morphology (e.g., size and distribution) in the continuous phase from ambient through curing conditions. The dispersions can also be substantially stable under conventional storage conditions for extended periods of time.

Compositions of this invention find a wide variety of uses in numerous applications where high performance engineering plastics are required. The compositions of this invention are useful in all applications in which epoxy resins are useful. The compositions of this invention can exhibit improved toughness and can maintain hardness at high application temperatures. For example, stable dispersions are used as coatings (e.g., solution, high solids or powder coatings); fiber-reinforced laminates; advanced composites useful, for example in aerospace structures, fiberglass reinforced plastics tooling, casting and molding resins; bonding agents; adhesives; encapsulants of electrical components which are exposed to wide temperature fluctuations; and the like.

DETAILED DESCRIPTION OF THE INVENTION

Epoxy resins useful in this invention include a wide variety of epoxy compounds. By "epoxy resin continuous phase" is meant the epoxy compounds and other compounds present during curing of the epoxy compounds, such as curing and hardening agents. Typically, the epoxy compounds are epoxy resins which are also referred to as polyepoxides. Polyepoxides useful herein can be monomeric (e.g., the diglycidyl ether of bisphenol A, novolac-based epoxy resins, and tris-epoxy resins), higher molecular weight advanced resins (e.g. the diglycidyl ether of bisphenol A advanced with bisphenol A) or polymerized unsaturated monoepoxides (e.g., glycidyl acrylates, glycidyl methacrylate, allyl glycidyl ether, etc.) to homopolymers or copolymers. Most desirably, epoxy compounds contain, on the average, at least one pendant or terminal 1,2-epoxy group (i.e., vicinal epoxy group) per molecule.

Examples of useful polyepoxides include the polyglycidyl ethers of both polyhydric alcohols and polyhydric phenols; polyglycidyl amines, polyglycidyl amides, polyglycidyl imides, polyglycidyl hydantoins, polyglycidyl thioethers, epoxidized fatty acids or drying oils, epoxidized polyolefins, epoxidized diunsaturated acid esters, epoxidized unsaturated polyesters, and mixtures thereof. Numerous polyepoxides prepared from polyhydric phenols include those which are disclosed, for example, in U.S. Pat. No. 4,431,782. Polyepoxides can be prepared from mono-, di- and tri-hydric phenols, and can include the novolac resins. Polyepoxides can include the epoxidized cyoloolefins; as well as the polymeric polyepoxides which are polymers and copolymers of glycidyl acrylate, glycidyl methacrylate and allylglycidyl ether. Suitable polyepoxides are disclosed in U.S. Pat. Nos. 3,804,735; 3,892,819; 3,948,698; 4,014,771 and 4,119,609; and Lee and Neville, *Handbook of Epoxy Resins*, Chapter 2, McGraw Hill, N. Y. (1967).

While the invention is applicable to polyepoxides, generally preferred polyepoxides are glycidyl polyethers of polyhydric alcohols or polyhydric phenols having weights per epoxide group of 150 to 2,000. These polyepoxides are usually made by reacting at least about two moles of an epihalohydrin or glycerol dihalohydrin with one mole of the polyhydric alcohol or polyhydric phenol, and a sufficient amount of a caustic alkali to combine with the halohydrin. The products are characterized by the presence of more than one epoxide group, i.e., a 1,2-epoxy equivalency greater than one.

The polyepoxide may also include a minor amount of a monoepoxide, such as butyl and higher aliphatic glycidyl ethers, phenyl glycidyl ether, or cresyl glycidyl ether, as a reactive diluent. Such reactive diluents are commonly added to polyepoxide formulations to reduce the working viscosity thereof, and to give better wetting to the formulation. As is known in the art, a monoepoxide affects the stoichiometry of the polyepoxide formulation and adjustments are made in the amount of curing agent and other parameters to reflect that change.

The grafted rubber particles useful in this invention have a core/shell structure. The core is a graftable elastomeric material. Preferably, the core is crosslinked to render it substantially insoluble in the epoxy resin phase. The cores are presized and maintain their morphology through curing of the resin. The core can range in size from about 300 Å to about 20,000 Å in diameter. For toughening applications, a high amount of elastomeric core relative to the total particle is preferably employed. However, for other applications, a low amount of elastomeric core is suitable. The core generally comprises at least 15 weight percent, preferably at least 50 weight percent and more preferably at least 70 weight percent but less than 90 weight percent of the total weight of grafted rubber particles. The weight of the components of the particles refers to the average weight of the components in the total amount of particles.

Although the cores of the particles are preferably crosslinked to render them insoluble, the cores can in themselves be insoluble in the resins, such as for example triblock copolymers or long-chain acrylate rubbers. By insoluble in the resin phase is meant that the elastomeric or rubbery core is rendered insoluble in the epoxy resin phase, or suitable solvents for the resins or inert diluents for the particles. That is, the elastomeric or rubbery component of the grafted rubber particles forms a gel and swells in the resin phase, but does not dissolve. Typically, in such a situation, the percent gel ranges from about 50 to about 95 percent of the weight of the particles, and the swelling index ranges from about 3 to about 50. The elastomeric or rubbery core components include conjugated dienes, acrylate rubbers and interpolymers of the type disclosed in U.S. Pat. No. 4,419,496, for example, polymerized butadiene, isoprene and acrylate monomers such as 2-ethylhexyl acrylate and butyl acrylate, and polysulfides, silicone rubbers, and the like. Preferably, the cores are crosslinked butadiene rubber.

The shell is grafted to the core and contains a functionality which is reactive with a functionality of the epoxy resin phase. The shell is compatible with the epoxy resin to contribute to steric stabilization. Such compatibility is exemplified by solubility in the resin when not attached to the core. If the shell is not compatible, coagulation of the particles can result. The shell can be a homopolymer or interpolymer. The shell performs two functions. One of the functions is to graft to the core, and stabilize the particles in the epoxy resin phase. The other function is to react with the epoxy resin phase during curing so that the particles are cocured into the resin phase. Typically, the shell has an attached phase and a non-attached phase. Where low viscosity dispersions are employed, it is desirable to minimize the amount of non-attached phase, because the non-attached phase contributes to the viscosity of the epoxy resin.

The amount of shell component is sufficient to effectively stabilize the reactive grafted rubber particles in the epoxy resin phase. This amount can vary depending on the size of the particles. For large particles, a relatively smaller amount of grafted shell is sufficient to stabilize the particles in the resin. For 1000 Å particles, typically, at least about 0.05 to about 0.5 parts, preferably to about 0.1 parts by weight of shell component per 1 part by weight of elastomeric core component will effectively stabilize the grafted rubber particles in the epoxy resin phase.

The weight average molecular weight of the shell can vary and generally ranges from about 10,000 to about 250,000. Lower molecular weight grafts typically result in dispersions with low viscosity, while higher molecular weight grafts result in dispersions with high viscosity. Advantageously, high molecular weight grafts provide the highest degree of improved toughness to the epoxy resin composition. The graft weight average molecular weight can be determined using techniques such as gel permeation chromotography on the non-attached phase in the grafted rubber concentrate.

The grafted shell compounds provide a compatibilizing interface which allows for dispersion of rubber particles in the epoxy compound. Preferred shell compounds are polymers which are soluble in the epoxy compound. Typically, the shell is comprised of ethylenically unsaturated compounds such as polymerized styrenics, acrylates and methacrylates, acrylonitrile, acrylic acid, methacrylic acid, hydroxypropyl acrylate, hydroxyethyl acrylate, vinylized glycidyl ethers such as glycidyl acrylate and methacrylate, and the like, and combinations thereof. Other preferred shell components are epoxy containing monomers, in polymerized form. The shell compounds contain a functionality which reacts with functionalities of the epoxy resin continuous phase. Included within the term epoxy resin continuous phase are curing agents, hardening agents, reactive and inert diluents, and initiators or catalysts. The amount of the resin phase-reactive compound in the shell is sufficient to attach the grafted rubber particles to the epoxy resin phase to impart toughening to the resin phase. This amount can vary according to the molecular weight of the shell. For example, for higher molecular weight shells, a lower amount of the resin phase-reactive compound is required. The amount of resin phase-reactive compound typically ranges from about 0.5 to about 20 weight percent based on the weight of the shell compound. Preferred resin phase-reactive compounds are epoxy-containing compounds, especially glycidyl methacrylate. Any combination of monomers which provides a polymer which is soluble in the epoxy resin continuous phase before curing, can be employed. Preferred combinations of monomers which polymerize to form functionalized shell polymers include styrene/acrylonitrile/glycidyl methacrylate; styrene/acrylonitrile/acrylic acid; and ethyl acrylate/methacrylic acid, styrene/methyl methylacrylate/glycidyl methacrylate, and styrene/acrylonitrile/methyl methylacrylate/glycidyl methacrylate.

Suitable particles in the form of grafted rubber concentrates are described in U.S. Pat. No. 4,419,496, and U.S. Pat. No. 4,366,289 which are incorporated herein by reference in their entirety. Other elastomeric particles are disclosed in U.S. Pat. No. 3,830,878, which is incorporated herein by reference.

The grafted rubber particles can be incorporated into the epoxy resin continuous phase using a variety of techniques. The particles can be readily dispersed in liquid epoxy resins, and can be combined with solid epoxy resins after the resin is melted or placed in solution. For example, the grafted rubber particles in the form of a latex in an aqueous phase can be contacted with the epoxy resin phase, and the aqueous phase can be subsequently removed. If desired, the aqueous phase latex, epoxy resin, and an organic solvent for the epoxy resin can be contacted, and the aqueous phase and organic solvent can be removed. If desired, a dried grafted rubber concentrate can be contacted with the epoxy compound and an optional organic solvent; and the solvent (if employed) can be removed. The grafted rubber particles are dispersed in the epoxy compound, preferably using a mixing or shearing device. After solvent and/or aqueous phase, if present, is removed the composition can be cured. Alternatively, a hardening agent can also be contacted with the grafted rubber particles, and this mixture can then be added to the epoxy resin continuous phase.

The dispersed phase is employed in a toughening amount (an amount sufficient to raise the fracture energy of the resin above the fracture energy of a cured unmodified resin system), which varies and which typically ranges from about 2 to about 45 weight percent of the total dispersion (i.e., epoxy resin plus dispersed phase). The optimum concentration of dispersed phase can vary depending upon the materials employed and the end use that is envisaged. The dispersions are usually made at a solids level at which the dispersions are to be used. However, it is possible to prepare higher dispersed phase volume dispersions and dilute to the final dispersed phase level.

The properties of the dispersion are influenced by a variety of factors including the identity of the components, the particle size and concentration of the disperse phase, the hardness or softness of the particles of the disperse phase, the concentration and nature of the graft compounds, and many other factors. Advantageously, the prefered dispersions exhibit moderately low viscosities, which provides a viscosity control which is desirable in epoxy compound applications.

For most practical applications, the stability of the dispersion and the property enhancement due to the dispersed phase will be optimized with particles that are less than about 20 microns. Typically, cores range in size from about 300 Å to about 20,000 Å, more desirably from about 900 Å to about 2,000 Å, in diameter. A bimodal distribution of particles can be desirable (e.g., a mixture of large and small particles, most preferably of about 8,000 Å particles and about 1,000 Å particles). This distribution of particles is obtained, for example, by agglomeration of smaller size particles or selective growth of particles. A mixture of particles of various sizes is particularly desirable because of improved rubber content relative to viscosity. The mixture of particles preferably range in size from about 900 Å to about 10,000 Å in diameter. The bimodal distribution is an example with small particles of from about 900 Å to about 1,500 Å in diameter, with larger size particles ranging from about 4,000 Å to about 10,000 Å.

The dispersions are solidified by subjecting the epoxy resin phase to curing conditions. The conditions are sufficient to cocure the grafted rubber particles with the epoxy resin phase. In the curing of polyepoxides, the choice of curing agent can influence the cure rate, the exotherm and resultant properties of the finished product. Curing agents or hardening agents and their influence are known in the literature as, for example, in the book, *Handbook of Epoxy Resins*, (supra) and in *Chemical Reactions of Polymers*, Interscience Publishers, New York, pages 912–926, (1967) and in other reference works. Some of these influences are illustrated in *Modern Plastics Encyclopedia*, pages 33–34, (1982-1983). The hardening agent can be added to the composition after the dispersion of grafted rubber particles in the epoxy resin phase is formed.

The cured products have improved toughness over those without the dispersed phase. Also, the heat distortion temperatures are improved over those exhibited by the products obtained by curing a polyepoxide containing dissolved carboxylated rubbers such as, for example, carboxy-terminated diene elastomers.

The following examples are presented to further illustrate but not limit the scope of this invention. All parts and percentages are by weight unless otherwise indicated.

EXAMPLE 1

Into a 1-gallon glass reactor is charged 2,689 g of a dispersion of a rubber latex. The latex dispersion contains 890 g rubber solids which solids represent 5 percent styrene, 93 percent butadiene and 2 percent acrylonitrile polymerized to yield a mixture of 56 percent diameter 8000 Å and 44 percent diameter 1400 Å solid particles. (The dispersion is stabilized with 0.92 percent sodium dodecylbenzene sulfonate soap.) The reactor is flushed with nitrogen and heated while under agitation at 150 rpm. When the reactor temperature reaches about 80° C., an aqueous stream containing 4.3 percent sodium dodecyl benzene sulfonate and 0.43 percent sodium persulfate is added over 6 hours at the rate of 63.5 g per hour. Simultaneously with the aqueous stream is added a monomer stream containing about 66 percent styrene, 25.4 percent acrylonitrile, 8.4 percent glycidyl methacrylate and 0.15 percent n-octyl mercaptan over the same 6 hour period at the rate of 137 g per hour. The reaction mixture is heated at a reactor temperature of 80° C. for an additional 30 minutes. The mixture is then steam stripped in order to remove residual monomer. To the mixture is added 0.4 g of alkylated polyphenols which are sold commercially as Topanol ® CA by Canadian Industries, and 1.4 g dilauryl thiodipropinate. The resulting dispersion contains 42.8 percent polymer solids, and the polymer contains 53.6 percent rubber in polymerized form. The polymer contains 36.4 percent grafted rigid phase and 10 percent nongrafted rigid phase. The grafted rubber resin so formed is isolated using freeze coagulation techniques and air dried.

A dispersion of the grafted rubber concentrate with an epoxy resin is prepared as follows 81.3 g of an epoxy resin which is a diglycidyl ether of bisphenol A (a liquid epoxy resin sold commercially by The Dow Chemical Company as D.E.R. ® 383 epoxy resin, having an epoxy equivalent weight of from 178 to 186 and a viscosity at 25° C. of between 9,000 and 11,500 centipoise) is dissolved in 50 g of methyl ethyl ketone by mixing said components together at room temperature. To this solution is added 18.7 g of the dry grafted rubber concentrate which has been described hereinbefore. This mixture is sheared at room temperature for 5 minutes using a Tekmar ® high shear device. The solvent and water are removed from the mixture by rotary evaporation under vacuum to yield a toughened epoxy dispersion having uniform dispersion and good stability. The viscosity of the toughened epoxy dispersion is low enough such that the sample is pourable at room temperature. The dispersion is crosslinked using a stoichiometric amount of methylene dianiline. The sample is designated as Sample No. 1.

For comparison purposes is provided an epoxy resin of the type described hereinbefore but which resin does not contain the grafted rubber concentrate. The epoxy resin is crosslinked using a stoichiometric amount of methylene dianiline. The sample is designated as Sample No. C-1.

Sample No. 2 is provided as follows: A grafted rubber concentrate is provided by polymerizing 319 g of the monomer mixture described hereinbefore in the presence of 1,080 g of rubber latex solids. The rubber latex solids have 80 percent 12,000 Å diameter and 20 percent 1,300 Å diameter solid particles. The grafted rubber concentrate has 13.1 percent attached rigid phase and 9.7 percent non-attached rigid phase; and the non-attached rigid phase has a molecular weight of 22,000. The dispersion of the grafted rubber concentrate in epoxy resin is provided by shearing 63.7 g of the grafted rubber latex dispersion (19.4 g of polymer solids) and 13.6 g of the previously described epoxy resin, and then removing water by rotary evaporation techniques. The dispersion of grafted rubber concentrate in epoxy resin is crosslinked using a stoichiometric amount of methylene dianiline.

Data concerning Sample Nos. 1, 2 and C-1 are presented in Table I.

TABLE I

| Sample | Percent Rubber in Sample | Tg (°C.)[1] | Fracture Energy[2] ($\times 10^5$ erg/cm$^2$) |
|---|---|---|---|
| 1 | 10 | 147 | 25 |
| 2 | 10 | 163 | 5.8 |
| C-1* | 0 | 163 | 2.6 |

*Not an example of the invention.
[1] Glass Transition Temperature.
[2] Fracture energy is determined using a double-edged notched tensile bar which is 0.125 inch thick and drawn at 0.2 inch/minute.

The data in Table I indicate that the samples of this invention exhibit excellent fracture energies with little, if any, lowering of the glass transition temperature.

EXAMPLE 2

A grafted rubber concentrate is prepared by polymerizing 20 parts of a 92 percent ethyl acrylate, 8 percent methacrylic acid mixture in the presence of 80 parts of a latex containing butadiene type rubber particles. The rubber particles have a 1,000 Å diameter and are comprised of, in polymerized form, 92 parts butadiene, 5 parts styrene and 3 parts acrylonitrile. The polymerization is carried out in an agitated reactor outfitted for nitrogen blanketing whereby there is charged into the reactor 1,009 parts of the aforementioned rubber particles in the form of a 35 percent solids latex dispersion, 360 parts water, 1 part acetic acid in order to provide a reaction mass pH of 4, 0.085 part of the bisodium salt of ethylenediamine tetraacetic acid, and 1.05 part potassium persulfate. The reaction mass is heated to 65° C. At this point, 2 continuous additions are simultaneously fed into the reactor. The first feed contains 68 parts of an aqueous solution containing 0.125 percent potassium persulfate and 2.5 percent sodium dodecylbenzene sulfonate; and said feed is added over a 1.25 hour period. The second feed contains 85 parts of a mixture containing 92 percent ethyl acrylate and 8 percent methacrylic acid; and said feed is added over a 1 hour period. After addition of the continuous feeds are completed, the reaction mass is maintained at 65° C., with stirring for an additional 3 hours.

A dispersion of the ethyl acrylate/methacrylic acid grafted rubber concentrate in epoxy resin is provided as follows: To 80 parts of epoxy resin maintained at 50° C. is added dropwise with agitation over a 15 minute period, 64.7 parts of a latex dispersion containing 20 parts of the previously described grafted rubber concentrate. The epoxy resin is a diglycidyl ether of bisphenol A. Water is removed from the uniform dispersion by evaporation in order to yield a viscous adhesive product. The sample is cured with triethylene tetraamine in order to provide a toughened resin exhibiting a glass transition temperature of 108° C.

EXAMPLE 3

Into a thermostatically controlled 500 ml round-bottomed flask equipped with a stirrer, reflux condenser and feed ports is charged 131.6 g deionized water, 0.45 g of an azobisisobutyronitrile initiator, sold commercially as Vazo ® 64 by E. I. duPont de Nemours and Co., and 346.8 of a partially coalesced latex. The latex is 34.6 percent solids in an aqueous medium, and the solids comprise 50 percent by volume particles having an average diameter of 0.1 mm and 50 percent by volume particles having an average diameter of 0.8 mm. The latex comprises in polymerized form 5 percent styrene, 92 percent butadiene and 3 percent acrylonitrile. The mixture which is charged into the flask is heated to 70° C. under nitrogen atmosphere. A monomer stream containing 27 g styrene, 11.25 g acrylonitrile and 6.75 g glycidyl methacrylate is added to the heated mixture over a 1.5 hour period. After the monomer stream addition is complete, the resulting mixture is continued to be heated at 70° C. for 2 hours in order to yield a latex dispersion of grafted rubber concentrate solids having 30.8 percent solids, and an average particle size of 1,390 Å as determined by light scattering.

The dispersion of latex particles in the epoxy resin continuous phase is provided as follows: Into a 1-liter container is charged 100 g of an epoxy resin which is a diglycidyl ether of bisphenol A having an epoxy equivalent weight of from 182 to 190 and a viscosity at 25° C. of between 11,000 and 14,000 centipoise and sold commercially as D.E.R.® 331 epoxy resin by The Dow Chemical Company. 100 g of this epoxy resin is mixed with 30 g methyl ethyl ketone and 97.4 g of the aqueous dispersion of grafted rubber concentrate particles. The aqueous phase is removed by azeotropic distillation by adding continuously 600 ml of methyl ethyl ketone to the refluxing pot at 80° C. to 90° C. and 1 atmosphere pressure while removing water and methyl ethyl ketone. Final finishing is accomplished by vacuum drying the dispersion overnight at 50° C.

EXAMPLE 4

Into a thermostatically controlled 500 ml round-bottomed flask equipped with a stirrer, reflux condenser and feed ports is charged 240 g deionized water, 0.9 g of the previously described Vazo ®64 initiator, and 337.2 g of a latex. The latex is 35.6 percent solids in an aqueous medium, and the solids particles have an average diameter of 1,140 Å. The latex comprises, in polymerized form, 92 percent butadiene, 5 percent styrene and 3 percent acrylonitrile. The polymer phase is 91 percent gel and the swelling index of the particles is 19. The mixture which is charged into the flask is heated to 70° C. under nitrogen atmosphere. 90 g of a monomer stream containing 60 g styrene, 25 g acrylonitrile and 15 g glycidyl methacrylate is added to the heated mixture over a 1.5 hour period. After the monomer stream addition is complete, the resulting mixture is continued to be heated at 70° C. for 1.5 hours in order to yield a latex dispersion of grafted rubber concentrate solids having 31.3 percent solids, and an average particle size of 1,410 Å as determined by light scattering.

Into a 1-liter stirred flask is charged 100 g of the previously described D.E.R. ® 331 epoxy resin, 100 g methyl ethyl ketone and 95.8 g of the aqueous dispersion of grafted rubber concentrate particles. The mixture is heated and the aqueous phase is removed by azeotropic distillation by continuously adding 600 ml of methyl ethyl ketone to the refluxing pot while removing water and methyl ethyl ketone at 80° C. to 90° C. at 1 atmosphere. Final finishing is accomplished by drying the dispersion overnight under vacuum at 50° C.

EXAMPLE 5

In a round-bottomed flask equipped with an agitator, reflux condenser and nitrogen blanket is charged 626.3 g of a 38.3 percent solids latex dispersion (which latex containing in polymerized form 92 parts butadiene, 5 parts styrene and 3 parts acrylonitrile and which has a particle size of 1,250 Å), 240 parts deionized water, and 0.45 g of the previously described Vazo ® 64 initiator. The reaction mass is heated to 70° C. To the reaction mass is added, over a 1.5 hour period, 45 g of a 60 parts styrene, 25 parts acrylonitrile and 15 parts glycidyl methacrylate monomer mixture. After addition of the monomer mixture is complete, the reaction mixture is heated at 70° C. for an additional 3 hours. The solids level of the latex dispersion product is 30.2 percent.

To 1,000 g of methyl ethyl ketone is added 250 g of the previously described latex dispersion. The mixture is allowed to phase separate overnight. To 1,185 g of the upper phase (i.e., methyl ethyl ketone phase) which is separated from the aqueous phase is added a mixture containing 275 g of the previously described D.E.R. ®331 epoxy resin and 275 g of methyl ethyl ketone. The mixture is subjected to vacuum distillation at 60° C. to 80° C.

The product which contains 25 percent grafted rubber concentrate and 75 percent epoxy resin is gel-free and pourable, having a viscosity of 24,000 cps at 25° C.

A coating is provided by mixing 5.4 g of the previously described product and 2 g of polyamide resin which is commercially available as Versamid ® 140 from Henkel Corporation. After mixing, coating of the mixture and casting at 5 mils onto cold rolled steel, the mixture is cured for 3 hours at 110° C. The reverse Gardner Impact of the sample is 80 inch pounds. For comparison purposes, a 4 g sample of the epoxy resin and 2 g of the previously described polyamide resin are mixed and similarly treated. The reverse Gardner Impact of the sample is 20 inch pounds.

What is claimed is:

1. An epoxy resin composition suitable for preparing toughened cured epoxy resins, comprising (1) an epoxy resin continuous phase and (2) a stabilized discontinuous phase of reactive grafted rubber particles, which particles have a resin-insoluble core grafted with a shell which is reactive under curing conditions with a functionality of the epoxy resin phase.

2. A process for providing toughened epoxy resins, said process comprising (1) dispersing in an epoxy resin continuous phase, a toughening amount of reactive grafted rubber particles which have a resin-insoluble core grafted with a shell which is reactive under curing conditions with a functionality of the epoxy resin, and (2) subjecting the resin and particle dispersion to conditions sufficient to cure the epoxy resin.

3. The composition of claim 1 wherein said particle ranges in size from about 300 Å to about 20,000 Å in diameter.

4. The composition of claim 1 wherein said discontinuous phase dispersed in said continuous phase ranges from about 2 to about 45 weight percent, based on the total weight of the composition.

5. The composition of claim 1 wherein said epoxy compound is a liquid polyepoxide.

6. The composition of claim 1 wherein said grafted rubber particle comprises polymerized butadiene.

7. The composition of claim 1 wherein the shell of the grafted rubber particle is comprised of an ethylenically unsaturated polymer containing a resin phase-reactive compound.

8. The composition of claim 7 wherein said shell has a weight average molecular weight which ranges from about 10,000 to about 250,000 as measured by gel permeation chromatography.

9. The composition of claim 7 wherein the polymer comprises in polymerized form styrene, acrylonitrile and acrylic acid.

10. The composition of claim 7 wherein the amount of resin phase-reactive compound ranges from about 0.5 to about 20 weight percent based on the weight of the shell.

11. The composition of claim 1 which is cured.

12. The composition of claim 1 wherein said grafted rubber particle comprises polymerized acrylic acid ester.

13. The composition of claim 1 wherein said continuous phase contains a hardening agent.

14. The composition of claim 13 wherein the shell is capable of reacting with a functionality of the hardening agent.

15. The composition of claim 1 wherein the shell is capable of reacting along with an epoxy functionality of the epoxy compound.

16. The composition of claim 13 wherein the shell comprises in polymerized form styrene, acrylonitrile and glycidyl methacrylate.

17. The process of claim 2 wherein said grafted rubber particles are contacted with a hardening agent prior to contacting said grafted rubber particles with said epoxy resin continuous phase.

18. The composition of claim 1 wherein the shell comprises in polymerized form, an epoxy containing monomer.

* * * * *

REEXAMINATION CERTIFICATE (3720th)

United States Patent [19]
Henton et al.

[11] B1 4,778,851
[45] Certificate Issued Feb. 9, 1999

[54] RUBBER-MODIFIED EPOXY COMPOUNDS

[75] Inventors: David E. Henton, Midland; Dale M. Pickelman, Auburn; Charles B. Arends; Victor E. Meyer, both of Midland, all of Mich.

[73] Assignee: The Dow Chemical Company, Midland, Mich.

Reexamination Request:
No. 90/004,266, Jun. 6, 1996

Reexamination Certificate for:
Patent No.: 4,778,851
Issued: Oct. 18, 1988
Appl. No.: 2,535
Filed: Jan. 12, 1987

Related U.S. Application Data

[63] Continuation-in-part of Ser. No. 749,078, Jun. 26, 1985, abandoned.

[51] Int. Cl.⁶ .................... C08G 63/48; C08L 51/00
[52] U.S. Cl. .................... 525/65; 525/119; 525/529; 525/902
[58] Field of Search .................... 525/902, 65

[56] References Cited

U.S. PATENT DOCUMENTS

| | | | |
|---|---|---|---|
| 3,830,878 | 8/1974 | Kato et al. | 260/876 |
| 3,833,683 | 9/1974 | Dickie et al. | 260/836 |
| 4,366,289 | 12/1982 | Keskkula et al. | 525/78 |
| 4,419,496 | 12/1983 | Henton et al. | 525/301 |
| 4,668,736 | 5/1987 | Robins et al. | 525/902 |

*Primary Examiner*—Edward J. Smith

[57] ABSTRACT

Epoxy resins contain a discontinuous phase dispersed therein, of grafted rubber particles having an insoluble rubber core and having a grafted shell containing a functionalized compound such as that provided by polymerized glycidyl methacrylate, which is reactive under curing conditions with a functionality of the epoxy resin phase. The dispersions are stable and are useful as curable coatings, and for providing toughened resins for structural applications.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–18 is confirmed.

* * * * *